US011557280B2

(12) United States Patent
Sanders et al.

(10) Patent No.: US 11,557,280 B2
(45) Date of Patent: *Jan. 17, 2023

(54) BACKGROUND AUDIO IDENTIFICATION FOR SPEECH DISAMBIGUATION

(71) Applicant: Google LLC, Mountain View, CA (US)

(72) Inventors: Jason Sanders, New York, NY (US); Gabriel Taubman, Brooklyn, NY (US); John J. Lee, Long Island City, NY (US)

(73) Assignee: Google LLC, Mountain View, CA (US)

( * ) Notice: Subject to any disclaimer, the term of this patent is extended or adjusted under 35 U.S.C. 154(b) by 207 days.

This patent is subject to a terminal disclaimer.

(21) Appl. No.: 17/101,946

(22) Filed: Nov. 23, 2020

(65) Prior Publication Data

US 2021/0082404 A1 Mar. 18, 2021

Related U.S. Application Data

(63) Continuation of application No. 16/249,211, filed on Jan. 16, 2019, now Pat. No. 10,872,600, which is a (Continued)

(51) Int. Cl.
*G10L 15/22* (2006.01)
*G10L 15/08* (2006.01)
(Continued)

(52) U.S. Cl.
CPC ............ *G10L 15/08* (2013.01); *G06F 16/685* (2019.01); *G10L 15/1815* (2013.01);
(Continued)

(58) Field of Classification Search
CPC ............... G10L 15/22; G10L 2015/223; G10L 2015/228; G10L 15/08; G10L 15/18;
(Continued)

(56) References Cited

U.S. PATENT DOCUMENTS 6,173,266 B1 1/2001 Marx et al.
6,829,599 B2 12/2004 Chidlovskii
(Continued)

OTHER PUBLICATIONS

Ingrid Lunden, "Another Siri-Like App, Voice Answer, Hits the App Store For Those Of Us Without The iPhones 4S," TechCmnch, Retrieved from <http://techcmnch.com/2012/04/18/another-siri-like-app-voice-answer-hits-the-app-store-for-thoseof-US-without-the-iphone-4s/>, Apr. 18, 2012.

(Continued)

*Primary Examiner* — Vijay B Chawan
(74) *Attorney, Agent, or Firm* — Honigman LLP; Brett A. Krueger; Grant Griffith

(57) ABSTRACT

Implementations relate to techniques for providing context-dependent search results. A computer-implemented method includes receiving an audio stream at a computing device during a time interval, the audio stream comprising user speech data and background audio, separating the audio stream into a first substream that includes the user speech data and a second substream that includes the background audio, identifying concepts related to the background audio, generating a set of terms related to the identified concepts, influencing a speech recognizer based on at least one of the terms related to the background audio, and obtaining a recognized version of the user speech data using the speech recognizer.

20 Claims, 4 Drawing Sheets

Related U.S. Application Data continuation of application No. 15/622,341, filed on Jun. 14, 2017, now Pat. No. 10,224,024, said application No. 16/249,211 is a continuation of application No. 14/825,648, filed on Aug. 13, 2015, now Pat. No. 9,812,123, said application No. 15/622,341 is a continuation of application No. 14/825,648, filed on Aug. 13, 2015, now Pat. No. 9,812,123, which is a continuation of application No. 13/804,986, filed on Mar. 14, 2013, now Pat. No. 9,123,338.

(60) Provisional application No. 61/778,570, filed on Mar. 13, 2013, provisional application No. 61/654,387, filed on Jun. 1, 2012, provisional application No. 61/654,518, filed on Jun. 1, 2012, provisional application No. 61/654,407, filed on Jun. 1, 2012.

(51) Int. Cl.
| | |
|---|---|
| *H04M 3/493* | (2006.01) |
| *G06F 16/683* | (2019.01) |
| *G10L 15/18* | (2013.01) |
| *G10L 25/48* | (2013.01) |
| *G10L 21/0272* | (2013.01) |
| *G10L 15/26* | (2006.01) |
| *G10L 21/0208* | (2013.01) |

(52) U.S. Cl.
CPC .............. *G10L 15/22* (2013.01); *G10L 15/26* (2013.01); *G10L 21/0272* (2013.01); *G10L 25/48* (2013.01); *H04M 3/4936* (2013.01); *G10L 21/0208* (2013.01); *G10L 2015/225* (2013.01); *H04M 2201/40* (2013.01); *H04M 2203/352* (2013.01)

(58) Field of Classification Search
CPC ... G10L 15/1822; G10L 15/183; G10L 15/30; G10L 2015/025; G10L 21/0208; G10L 15/065; G10L 15/16
See application file for complete search history.

(56) References Cited

U.S. PATENT DOCUMENTS

| | | | |
|---|---|---|---|
| 7,024,366 | B1 | 4/2006 | Deyoe et al. |
| 7,139,717 | B1 | 11/2006 | Abella et al. |
| 7,197,460 | B1 | 3/2007 | Gupta et al. |
| 7,249,011 | B2 | 7/2007 | Chou et al. |
| 7,286,987 | B2 * | 10/2007 | Roy .................... G10L 15/1822 704/254 |
| 7,418,391 | B2 | 8/2008 | Gayama et al. |
| 7,451,089 | B1 | 11/2008 | Gupta et al. |
| 7,587,324 | B2 | 9/2009 | Kaiser |
| 7,702,508 | B2 | 4/2010 | Bennett |
| 7,734,471 | B2 | 6/2010 | Paek et al. |
| 7,869,998 | B1 | 1/2011 | Di Fabbrizio et al. |
| 7,933,775 | B2 | 4/2011 | Quibria et al. |
| 8,032,481 | B2 | 10/2011 | Pinckney et al. |
| 8,117,197 | B1 | 2/2012 | Cramer |
| 8,126,719 | B1 | 2/2012 | Jochumson |
| 8,160,883 | B2 | 4/2012 | Lecoeuche |
| 8,185,539 | B1 | 5/2012 | Bhardwaj |
| 8,214,214 | B2 | 7/2012 | Bennett |
| 8,265,939 | B2 | 9/2012 | Kanevsky et al. |
| 8,280,888 | B1 | 10/2012 | Bierner et al. |
| 8,296,144 | B2 | 10/2012 | Weng et al. |
| 8,473,299 | B2 | 6/2013 | Di Fabbrizio et al. |
| 8,611,876 | B2 | 12/2013 | Miller |
| 8,612,223 | B2 | 12/2013 | Minamino et al. |
| 8,725,512 | B2 | 5/2014 | Claiborn et al. |
| 8,825,482 | B2 | 9/2014 | Hernandez-Abrego et al. |
| 9,123,338 | B1 | 9/2015 | Sanders et al. |
| 9,311,915 | B2 * | 4/2016 | Weinstein ............... G10L 15/16 |
| 9,405,363 | B2 | 8/2016 | Hernandez-Abrego et al. |
| 9,552,816 | B2 * | 1/2017 | VanLund .............. G06F 9/5011 |
| 9,812,123 | B1 | 11/2017 | Sanders et al. |
| 2001/0021909 | A1 | 9/2001 | Shimomura et al. |
| 2002/0069058 | A1 | 6/2002 | Jin et al. |
| 2002/0198707 | A1 | 12/2002 | Zhou |
| 2004/0215449 | A1 * | 10/2004 | Roy .................... G10L 15/1822 704/211 |
| 2005/0091056 | A1 | 4/2005 | Surace et al. |
| 2006/0122837 | A1 | 6/2006 | Kim et al. |
| 2006/0149544 | A1 | 7/2006 | Hakkani-Tur et al. |
| 2006/0190809 | A1 | 8/2006 | Hejna |
| 2006/0248057 | A1 | 11/2006 | Jacobs et al. |
| 2007/0043571 | A1 | 2/2007 | Michelini et al. |
| 2007/0061142 | A1 | 3/2007 | Hernandez-Abrego et al. |
| 2007/0136246 | A1 | 6/2007 | Stenchikova et al. |
| 2007/0192095 | A1 | 8/2007 | Braho et al. |
| 2008/0133245 | A1 | 6/2008 | Proulx et al. |
| 2008/0221901 | A1 * | 9/2008 | Cerra .................... G10L 15/065 704/270.1 |
| 2008/0221902 | A1 * | 9/2008 | Cerra .................... G10L 15/065 704/235 |
| 2009/0070113 | A1 | 3/2009 | Gupta et al. |
| 2010/0104087 | A1 | 4/2010 | Byrd et al. |
| 2010/0125456 | A1 | 5/2010 | Weng et al. |
| 2011/0015928 | A1 | 1/2011 | Odell et al. |
| 2011/0066634 | A1 * | 3/2011 | Phillips .................... G10L 15/22 707/769 |
| 2011/0288855 | A1 * | 11/2011 | Roy .................... G10L 15/1822 704/9 |
| 2012/0041950 | A1 | 2/2012 | Koll et al. |
| 2012/0063620 | A1 | 3/2012 | Nomura et al. |
| 2012/0136667 | A1 | 5/2012 | Emerick et al. |
| 2012/0265528 | A1 * | 10/2012 | Gruber .................... G10L 15/18 704/235 |
| 2013/0086029 | A1 | 4/2013 | Hebert |
| 2014/0006019 | A1 * | 1/2014 | Paajanen ............. G10L 21/0208 704/233 |
| 2014/0229866 | A1 | 8/2014 | Gottlieb |
| 2015/0039299 | A1 * | 2/2015 | Weinstein ............... G10L 15/16 704/202 |

OTHER PUBLICATIONS

Qiaoling et al., "Predicting Web Searcher Satisfaction with Existing Community-based Answers," Proceedings of the 34th international ACM SIGIR conference on Research and development in Information Retrieval. ACM, 2011.

Youtube video uploader—sparklingapps, "Voice Answer: a 'Siri like application for All iPhones and iPads", Uploaded Jan. 20, 2012, Yotube Published Video link <https://youtu.be/zNufnccFIRc>.

* cited by examiner

BACKGROUND AUDIO IDENTIFICATION FOR SPEECH DISAMBIGUATION

CROSS-REFERENCE TO RELATED APPLICATIONS

This patent application is a continuation of, and claims priority under 35 U.S.C. § 120 from, U.S. patent application Ser. No. 16/249,211, filed on Jan. 16, 2019, which is a continuation of U.S. patent application Ser. No. 15/622,341, filed on Jun. 14, 2017, which is a continuation of U.S. patent application Ser. No. 14/825,648, filed on Aug. 13, 2015, which is a continuation of U.S. patent application Ser. No. 13/804,986, filed on Mar. 14, 2013, which claims priority under 35 U.S.C. § 119(e) from, U.S. Provisional Application No. 61/654,387, filed on Jun. 1, 2012, U.S. Provisional Application No. 61/654,407, filed on Jun. 1, 2012, U.S. Provisional Application No. 61/654,518, filed on Jun. 1, 2012, and U.S. Provisional Application No. 61/778,570, filed on Mar. 13, 2013. The disclosures of these prior applications are considered part of the disclosure of this application and are hereby incorporated by reference in their entireties.

BACKGROUND

The techniques provided herein relate to speech disambiguation.

Speech recognition systems attempt to identify one or more words or phrases from a received audio stream. In some implementations, the identified words can be used to perform a particular task, e.g., dialing a phone number of a particular individual, generating a text message, and other tasks. A user can submit an audio steam using a device, such as a mobile telephone, that includes a microphone. Sometimes users submit audio streams to the device that are ambiguous in that the speech may relate to more than one concept and/or entity.

SUMMARY

In general, one innovative aspect of the subject matter described in this specification can be embodied in methods that include disambiguating speech received in an audio segment based on the background audio include in the audio segment. For instance, a user can say a phrase that a system may interpret to be "shack" when the speaker actually said the word "Shaq," as in Shaquille O'Neal. If, for example, there is background audio included in the received audio segment, that background audio can be separated or otherwise distinguished from the speech included in the audio stream.

Then, one or more concepts can be identified in the background audio. For example, if the background audio included theme music associated with the National Basketball Association (NBA), the concept "NBA" can be associated with the background audio. These one or more concepts can be used to influence a speech recognizer that analyzes the speech included in the audio stream. For example, because there is an NBA concept associated with the background audio, the speech recognizer may be influenced to recognize what may normally be recognized as the word "shack" as the word "Shaq," because Shaquille O'Neal played in the NBA.

In a first aspect, a computer-implemented method includes receiving an audio stream at a computing device during a time interval, the audio stream comprising user speech data and background audio, separating the audio stream into a first substream that includes the user speech data and a second substream that includes the background audio, identifying concepts related to the background audio, generating a set of terms related to the identified concepts, influencing a speech recognizer based on at least one of the terms related to the background audio, and obtaining a recognized version of the user speech data using the speech recognizer.

Implementations can include any, all, or none of the following features. The method can further include recognizing voice pattern information associated with a user, and using the voice pattern information to separate the user speech data from the background audio. Identifying concepts related to the background audio can include recognizing at least a portion of the background audio by matching it to an acoustic fingerprint and identifying concepts related to the background audio can include concepts associated with the acoustic fingerprint. The acoustic fingerprint can be an acoustic fingerprint for an audio sample from a media recording. Generating a set of terms related to the background audio can include generating a set of terms based on querying a conceptual expansion database based on the concepts related to the background audio. The conceptual expansion database can contain a plurality of documents related to a plurality of concepts and the generated set of terms can include terms that are determined to be keywords for the documents in the conceptual expansion database. The first substream only can include audio from the audio stream obtained during a portion of the time interval. Influencing the language model can include increasing the probability that at least one of the terms related to the background audio will be obtained. Influencing the language model can further include measuring the relevance of a term related to the background audio and increasing the probability that at least one of the terms related to the background audio based on the measured relevance.

In a second aspect, a system includes one or more computers and one or more storage devices storing instructions that are operable, when executed by the one or more computers, to cause the one or more computers to perform operations including receiving an audio stream during a time interval, the audio stream including user speech data and background audio, separating the audio stream into a first substream that includes the user speech data and a second substream that includes the background audio, identifying concepts related to the background audio, generating a set of terms related to the identified concepts, influencing a speech recognizer based on at least one of the terms related to the background audio, and obtaining a recognized version of the user speech data using the speech recognizer.

Implementations can include any, all, or none of the following features. The operations can further include recognizing voice pattern information associated with a user and using the voice pattern information to separate the user speech data from the background audio. Identifying concepts related to the background audio can include recognizing at least a portion of the background audio by matching it to an acoustic fingerprint and identifying concepts related to the background audio can include concepts associated with the acoustic fingerprint. The acoustic fingerprint can be an acoustic fingerprint for an audio sample from a media recording. Generating a set of terms related to the background audio can include generating a set of terms based on querying a conceptual expansion database based on the concepts related to the background audio. The conceptual expansion database can contain a plurality of documents related to a plurality of concepts and the generated set of terms can include terms that are determined to be keywords for the documents in the conceptual expansion database. The first substream only can include audio from the audio stream obtained during a portion of the time interval. Influencing the language model can include increasing the probability that at least one of the terms related to the background audio will be obtained. Influencing the language model can further include measuring the relevance of a term related to the background audio and increasing the probability that at least one of the terms related to the background audio based on the measured relevance.

In a third aspect, a computer-readable storage device storing software includes instructions executable by one or more computers which, upon such execution, cause the one or more computers to perform operations including receiving an audio stream at a computing device during a time interval, the audio stream including user speech data and background audio, separating the audio stream into a first substream that includes the user speech data and a second substream that includes the background audio, identifying concepts related to the background audio, generating a set of terms related to the identified concepts, influencing a speech recognizer based on at least one of the terms related to the background audio, and obtaining a recognized version of the user speech data using the speech recognizer.

Implementations can include any, all, or none of the following features. The operations can further include recognizing voice pattern information associated with a user and using the voice pattern information to separate the user speech data from the background audio.

Particular embodiments of the subject matter described in this specification can be implemented so as to realize one or more of the following advantages. Using background audio to clarify an ambiguous search query may improve the accuracy of the speech recognition. This can in-turn improve the accuracy of any tasks that take utilize the recognized speech, including but not limited to, speech-to-text based searching and speech-to-text based document composition.

The details of one or more embodiments of the subject matter of this specification are set forth in the accompanying drawings and the description below. Other features, aspects, and advantages of the subject matter will become apparent from the description, the drawings, and the claims.

DESCRIPTION OF DRAWINGS

The accompanying drawings, which are incorporated in and constitute a part of this specification, illustrate implementations of the described technology. In the figures.

Like reference numbers and designations in the various drawings indicate like elements.

DETAILED DESCRIPTION

Users provide voice input to computing devices for many different reasons. For example, based on the voice input provided, a user may wish to generate a document, initiate a search, initiate communication with someone else, initiate the playing of media, such as music or movies, or for other reasons.

In some implementations, and based on certain circumstances, users may be required by law to provide voice input instead of text input to their computing devices. For example many states require that the operators of smart phones and other handheld devices operate the device in a "hands-free" mode while driving. Typically to perform an action while a user is operating in a "hands-free" mode, spoken commands are provided instead of providing text-based commands or performing other physical interactions with the device.

But sometimes, the provided voice input is ambiguous or can otherwise be misinterpreted by a speech recognizer. For example, consider someone speaking the phrase "DARK KNIGHT," referring to a DC COMICS' character BATMAN. In the absence of other identifying information, the phrase "DARK KNIGHT" might be identified by a speech recognizer as the phrase "Dark Night." This may lead to certain errors, such as providing an incorrect spelling in a text, or providing incorrect text into a movie application executing on the computing device, as well as other possible errors.

If there is also background audio included with the voice input, however, the background audio can be used to supplement, influence, or otherwise override the manner in which the speech recognizer determines the speech that is recognized. For example, a theme music associated with BATMAN, such as theme songs associated with any of the BATMAN movies or television shows, being played in the background when a user speaks can be used to influence the speech recognizer. In some implementations, the background audio can be distinguished from voice audio in the audio stream. This background audio can be separated from the voice audio in the audio stream and one or more concepts can be identified that are associated with the background audio. For example, the BATMAN theme music can be associated with a BATMAN concept, a superhero concept, a comic concept, a movie concept, a television concept, or some combination based on the particular theme music. That is, the context of the background audio thus allows ambiguous speech data to be matched to more relevant results.

Reference will now be made in detail to example implementations, which are illustrated in the accompanying drawings. Where possible the same reference numbers will be used throughout the drawings to refer to the same or like parts.

Figure 1A:
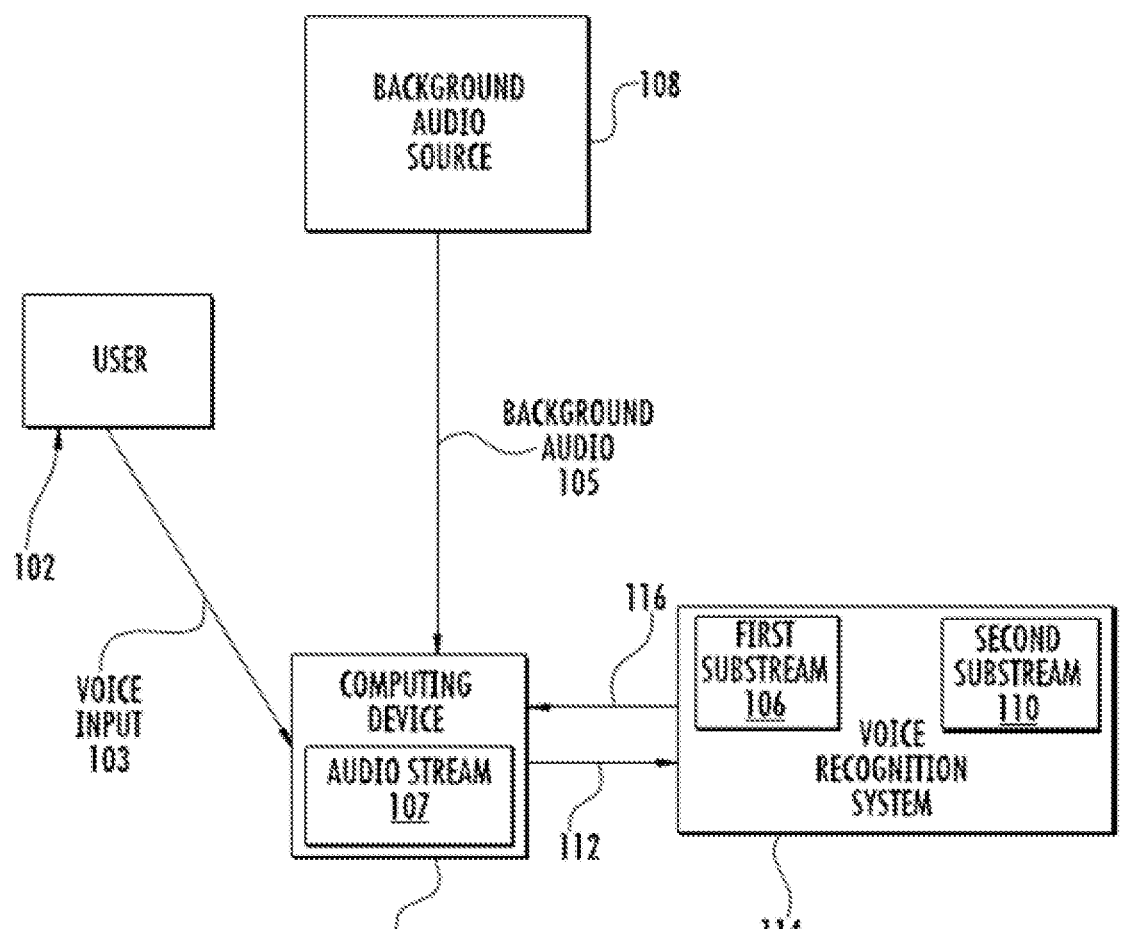
FIG. 1A is a schematic diagram of an example implementation.

FIG. 1A is a schematic diagram of an example implementation. Per FIG. 1A, a user 102 provides voice input 103 to be recognized using a voice recognition system. The user 102 may do so for a variety of reasons, but in general, the user 102 may want to perform some task using one or more concepts provided in the voice input 103. For example, the user 102 may wish to have the computing device 104 "dial mom," or "find the nearest gas station."

In general, when the user 102 provides the voice input 103, some aspect of the background may also be received by the computing device 104 from one or more background audio sources 108. For example, if the user 102 is driving in their car, and a radio or other device is playing in the background, the radio background audio source 108 my provide background audio 105 the computing device. Background audio sources 108 can include, but are not limited to, radio, television, ambient background noise, conversations being had by other people besides the user, and other audio that is generally not determined to be from the user 102. In some implementations the computing device 104 can use conventional techniques, such as triangulation to determine what is voice input 103 and what is background audio 105, although other techniques are also possible.

In some implementations, a combination of voice input 103 and background audio 105 may be received by the computing device as an audio stream 107. For example, the voice input 103 and the background audio 105 can be received during a substantially similar time interval and combined to form the audio stream 107. That is, the audio stream can include both the voice input 103 and the background 105 in a single representation.

A voice recognition system 114 can receive both the voice input 103 and the background audio 105 and use a combination of each to recognize concepts presented in the voice input 103. In some implementations, the voice recognition system 114 can receive the audio stream 107 using communications channel 112 and detect a first substream 106 and a second substream 110 corresponding to the voice input 103 and the background audio 105, respectively. In other implementations, the voice recognition system 114 can receive the first substream 106 and the second substream 110 from the computing device 104, where the computing device has isolated the first substream 106 and second substream 110 using conventional techniques.

The voice recognition system 114 utilizes techniques disclosed herein to identify background audio 105 in the second substream 110 and retrieve terms that are related to the background audio 105. For example, if the background audio 105 is a popular song, the voice recognition system 114 can retrieve a set of terms or concepts that include other songs by the same artist, the name of the album on which the song appears, the names of the performers, and other concepts. The voice recognition system 114 can use the retrieved terms or concepts to influence the speech that is recognized by the voice recognition system 114.

For example, if the voice recognition system 114 receives voice input 103 that includes the phrase "Dark Night" and background audio 105 that includes a portion of theme music for a BATMAN movie, the voice recognition system 114 can use concepts associated with BATMAN to influence or otherwise override the speech recognizer's 114 typical determination that the voice input 103 should be recognized as "Dark Night."

In some implementations, one or more concepts stored in one or more data repositories can be included in the voice recognition system 114. In some implementations, the voice recognition system 114 may communicate with a search system that identifies the one or more related concepts based on one or more query terms associated with aspects of the voice input 103 and the background audio 105. In some implementations the voice recognition system 114 may be an application or service being executed by the computing device 104. In some implementations, the voice recognition system 114 may be an application or service being executed by a server system in communication with the computing device 104.

The background audio source 108 may produce background audio 105 that the user 102 may want to keep private or otherwise would prefer not to have recorded and/or analyzed. For example, background audio 110 may include a private conversation, or some other type of background audio 110 that user 102 does not wish to have captured. Even background audio that may seem innocuous, such as a song playing in the background, may divulge information about user 102 that user 102 would prefer not to have made available to a third party.

Because of the need to ensure that the user is comfortable with having the background audio processed in case the background audio includes content that the user does not wish to have recorded and/or analyzed, implementations should provide the user 102 with a chance to affirmatively consent to the receipt of background audio 105 before receiving or analyzing audio that is received from the background audio source 108. Therefore, the user 102 may be required to take an action to specifically indicate that he or she is willing to allow the implementations to capture background audio 105 before the implementations are permitted to start recording background audio 105.

For example, computing device 104 may prompt the user 102 with a dialog box or other graphical user interface element to alert the user 102 with a message that makes the user 102 aware that the computing device 104 is about to monitor background audio 105. For example, the message might state, "Please authorize use of background audio. Please note that information about background audio may be shared with third parties." Thus, in order to ensure that the background audio 105 is gathered exclusively from consenting users, implementations can notify the user 102 that gathering the background audio 105 is about to begin, and furthermore that the user 102 should be aware that information corresponding to or associated with the background audio 105 that is accumulated may be shared in order to draw conclusions based on the background audio 105.

After the user 102 has been alerted to these issues, and has affirmatively agreed that he or she is comfortable with recording the background audio 105, will the background audio 105 be gathered from background audio source 108. Furthermore, certain implementations may prompt the user 102 again to ensure that user 102 is comfortable with recording the background audio 105 if the system has remained idle for a period of time. That is, the idle time may indicate that a new session has begun and prompting the user 102 again will help ensure that user 102 is aware of privacy issues related to gathering background audio 105 and is comfortable having the background audio 105 recorded.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed.

For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Figure 1B:
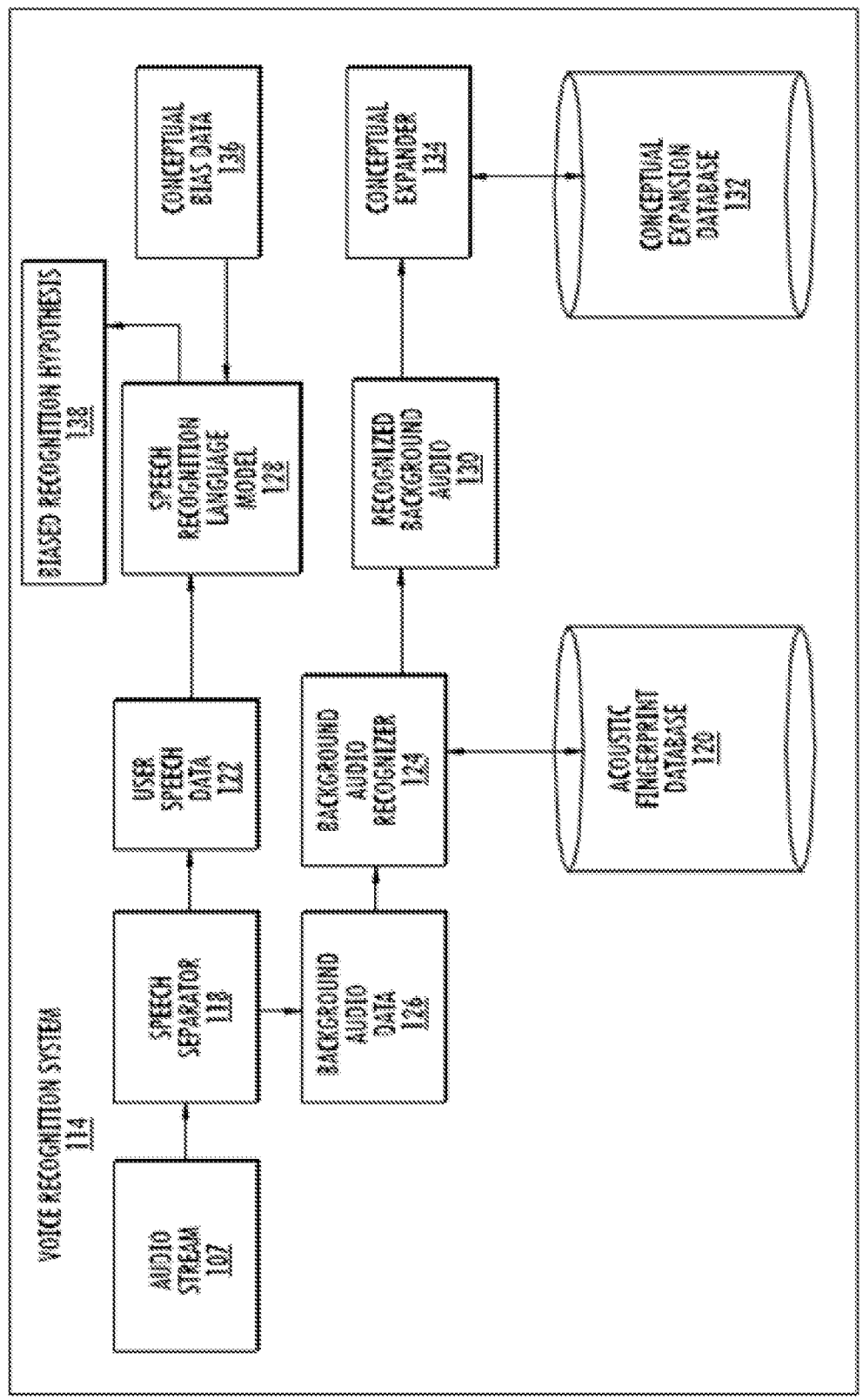
FIG. 1B is a schematic diagram of a voice recognition system included in an example implementation.

FIG. 1B is a schematic diagram of the voice recognition system 114 included in an example implementation. The voice recognition system 114 can be used to recognize one or more spoken words using a number of different techniques. In general, the voice recognition system 114 uses a language model and one or more items of biasing data to determine a textual representation of received voice input 103. Such use of biasing data may generally allow for improved speech recognition.

In general, the operation of voice recognition system 114 involves receipt of the voice input 103 and the background audio 105 from the computing device 104. In some implementations, the voice input 103 and the background audio 105 can be in a single audio stream 107. In some implementations, the speech recognition system 114 can subdivide the audio stream 107 into a first substream 106 and a second substream 110 using a speech separator 118.

For example, the speech separator 118 can use any number of conventional techniques to identify portions of the audio stream 107 that correspond to the first substream 106 and the second substream 110. For example one technique may include, digital sampling and phoneme matching, although other techniques are possible.

Once identified, the speech separator 118 can also generate user speech data 122 and background audio data 126 from the first substream 106 and the second substream 110, respectively. For example, the speech separator 118 can use various analog-to-digital conversion techniques to convert either of the first substream 106 or the second substream 110 into corresponding digital representations user speech data 122 and background audio recognizer 124, respectively.

Aspects of the user speech data 122 may be ambiguous, however, especially if user speech data 122 includes words that have different spellings while still having a substantially similar pronunciation. For example, words used as slang and in popular culture contexts can be difficult for some speech recognition systems because those words may be substantially identical in pronunciation to words that have different spellings.

In some implementations, however, background audio data 126 may be processed in order to lead to results that allow it to help improve speech recognition accuracy for the user speech data 122. For example, the background audio data 126 can be processed by the background audio recognizer 124 to identify one or more concepts of the background audio data 126 that can improve the accuracy of the speech recognition.

In some implementations, the background audio recognizer 124 analyzes background audio data 126 and determines that background audio data 126 includes audio that corresponds to a known segment of audio. One example of how audio may be a known segment of audio is if the audio includes audio from an existing media source, such as an audio component of a television or movie, or a piece of music, although other identifications that can be made from analyzing the background audio. For example, simple examples of identified background audio may be dialogue from an episode of a BATMAN television series or theme music from one of the BATMAN movies. However, other implementations might take advantage of other identifications, such as recognizing voices of participants in a background conversation or recognizing noises made by a certain type of animal.

Background audio recognizer 124 is capable of identifying an audio sample using conventional techniques. For example, background audio recognizer 124 accepts as an input data reflecting an unknown audio sample, uses such information to match the unknown audio sample to a known audio sample, and outputs an identification of the known audio sample.

Background audio recognizer 124 thus includes or is coupled to a database storing data reflecting a large number of audio samples, e.g., songs, television program audio, etc. Example data reflecting an audio sample can include a spectrogram of the sample, or derivations of a spectrogram of the sample, e.g., a hash of part of the spectrogram. The spectrogram can include or be represented by, for example, identified peaks, e.g., local maxima, in a frequency domain.

One way that background audio recognizer 124 may be able to recognize background audio data 126 is to use an acoustic fingerprint database 120. The acoustic fingerprint database 120 may communicate with background audio recognizer 124 to process background audio data 126, produce fingerprints of background audio data 126 that represent features of background audio data 126, and match those fingerprints to other fingerprints in the acoustic fingerprint database 120.

For example, the background audio recognizer 124 may receive the background audio data 126 and code fingerprints based on the background audio data 126. By using those fingerprints as a query into the acoustic fingerprint database 120, the background audio recognizer 124 may be able to draw a conclusion, such as that an audio snippet of a BATMAN movie is playing in the background.

After the background audio recognizer 124 recognizes the background audio data 126, the background audio recognizer 124 may produce recognized background audio 130. In some implementations, the next stage performed by voice recognition system 114 is that the recognized background audio 130 is processed using a conceptual expander 134, although other optional processing is also possible.

In general, the role of the conceptual expander 134 is to take the recognized background audio 130 and use the identification information for the recognized background audio 130 to produce one or more terms that can be used to influence the speech recognition to improve the results. The conceptual expander 134 is capable of returning, in response to an identification of an audio sample, terms related to such sample. Thus, a mapping engine can include or be coupled to a relational database, and can map an identification of an audio sample to terms related to the audio sample in the database.

One example of an information repository that can serve in the role of the conceptual expander 134 is an interconnected network of concepts, for example a comprehensive collection of real-world entities, such as people, places, things, and concepts along with the relationships and factual attributes that describe them. Examples of such networks include the Google Knowledge Graph, or Wikipedia. These networks describe entities that are related to literals in specific ways. As discussed above, recognized background audio 132 may include information about terms related to background audio 110.

If the conceptual expander 134 uses such a network of concepts, it becomes possible to use the terms to identify entities and related literals that can be considered for use in query disambiguation. For example, suppose that the recognized background audio 130 is a clip from the "Men in Black" theme song, sung by Will Smith. The network of concepts may serve in the role of the conceptual expander 134 based on this information. The recognized background audio 130 may lead the network of concepts to suggest certain topics or entities as being relevant, based on the recognized background audio 130.

For example, the entities "Will Smith" and "Men in Black" might be derived from the recognized background audio 130. Based on these entities, the network of concepts can provide attributes that have a relationship with these entities, defined by a schema. For example, the network of concepts can provide the date "Sep. 25, 1968" as having the "date of birth" relationship to "Will Smith," or "Tommy Lee Jones" as having a "lead actor" relationship to "Men in Black." Because the network of concepts may be a repository of entities that are associated with related attributes, the network is well-suited to begin with entities derived from recognized background audio 130 and suggest related attributes as terms that expand the concepts and improve speech recognition performance.

That is, the recognized background audio 130 can be used by the conceptual expander 134 to search in the conceptual expansion database 132 for one or more concepts to improve the results of a speech recognition process. For example, conceptual expansion database 132 might include an article about BATMAN that could be mined to produce terms that are indicative of the "DARK KNIGHT" (instead of "Dark Night") in that context. For example, terms might be "BATMAN," "Bruce Wayne", "Detective" or other terms.

The identified terms can be provided to a search system to generate conceptual bias data 136. For example, the terms "BATMAN," "Bruce Wayne", "Detective" or other terms may be provided to a search system or terms can be used. The search system can search one or more documents or mine one or more query logs to obtain additional information about the concepts specified by the one or more terms. As another example, the terms can be used in the context of an interconnected network of concepts to obtain additional related concepts to the one or terms.

This additional information can be used to generate conceptual bias data 136. For example, the term "BATMAN" would likely yield a search result that associates "BATMAN" with one or more nicknames, including "THE DARK KNIGHT." This association can form at least part of the conceptual bias data 136 that can be used to supplement or otherwise influence a determination made by the speech recognition system 114.

For example, the conceptual bias data 136 can be provided to a speech recognition language model 128 to influence a biased recognition hypothesis 138 regarding the correct textual representation of the user speech data 122. The speech recognition language model 128 can use a variety of conventional techniques to determine one or more textual representations of the user speech data 122. For example, the speech recognition language model 128 can use a combination of signal sampling, and phoneme matching to determine one or more text strings that satisfy a scoring value or other threshold.

Those text strings that satisfy the scoring value or other threshold may be considered as potential textual representations of the user speech data 122. In some implementations, the potential textual representations can be compared with statistical data or other data, including the conceptual bias data 136, to determine the most likely textual representation for the biased recognition hypothesis 138. In some implementations, the conceptual bias data 136 controls such a determination. For example, even though the term "Dark Night" is more statistically likely, in the context of the above examples the textual representation "DARK KNIGHT" is selected based essentially on the conceptual bias data 136.

Figure 1C:
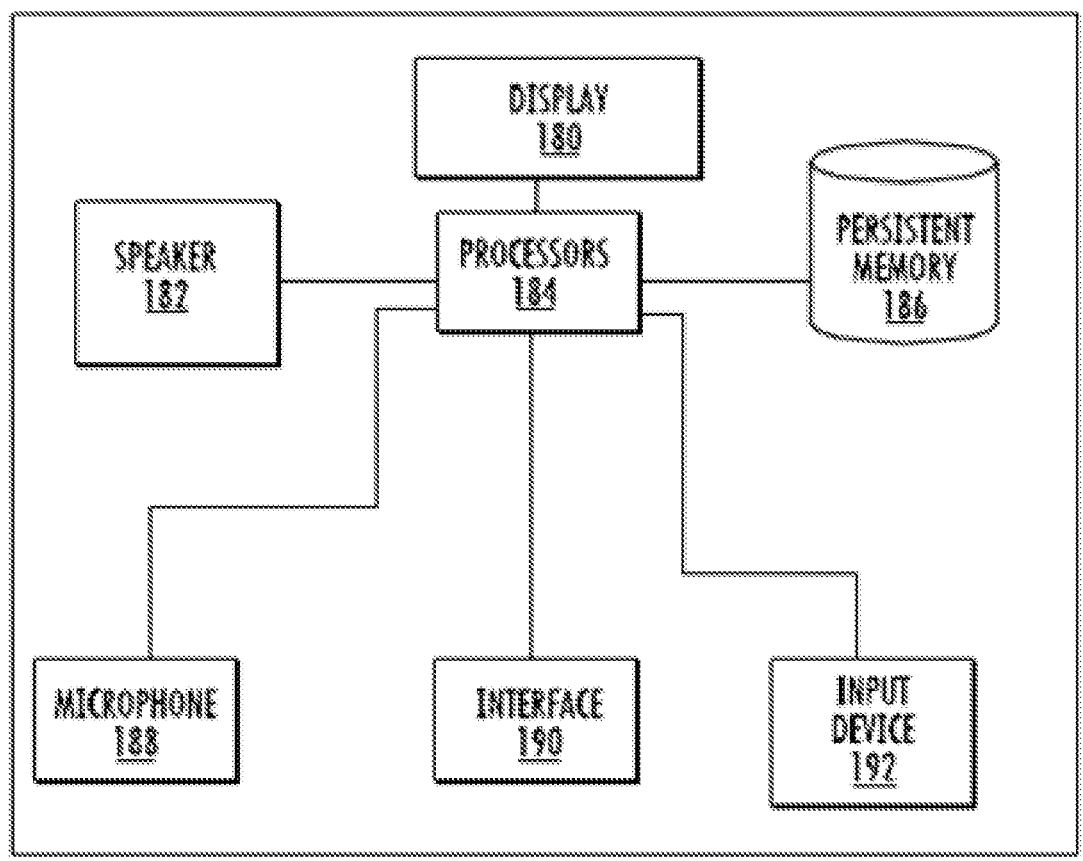
FIG. 1C is a schematic diagram of a computing device included in an example implementation.

FIG. 1C is a schematic diagram of a computing device included in an example implementation, such as computing device 104. In particular, FIG. 1C illustrates various hardware and other resources that can be used in implementations directed to speech recognition. The computing device 104 in some implementations can be a mobile telephone, a personal digital assistant, a laptop computer, a desktop computer, or another computer or hardware resource.

The computing device 104 can be communicatively coupled to the voice recognition system 114 through the communications channel 112 by way of an interface 190. The interface 190 can include one or more components of the computing device 104 that allows computing device 104 to interact with other components such as the voice recognition system 114, a display 180, and other components. The communications channel 112 can include, for example, a cellular communications channel, the internet, another network, or another wired or wireless data connection, in any combination.

The computing device 104 further includes one or more processors 184, which are coupled to various components and can be used to execute commands for the one or more coupled components. For example, the one or more processors can execute commands that output sound to a speaker or receive audio through a microphone 188.

The computing device 104 also includes persistent memory 186. The persistent memory 186 can be any computer-readable storage device including random access memory (RAM) and read-only memory (ROM). The persistent memory 186 may include instructions, that when executed by the one or more processors 184 cause the computing device 104 to perform the techniques described in this document to provide improved speech recognition accuracy.

The computing device 104 also includes a display 180. The display 180 can be, by way of non-limiting example, a liquid crystal display. In some implementations, display 180 can be a touchscreen. If, for example, the display 180 is a touchscreen, the display 180 can present or otherwise include a user interface, such as a virtual keyboard.

The computing device 104 also includes an input device 192. The input device 192 can be, for example, a physical keyboard, e.g., a keyboard that includes physical, as opposed to virtual, keys, a stylus, a mouse, or other input devices. In some implementations, the input device 192 can be combined with the display 180. As described above, display 180 can be implemented using a touchscreen, and in such implementations, the touchscreen can include a virtual keyboard as the input device 192.

The computing device 104 may include a microphone 188, which may be omnidirectional and capable of picking up background audio in addition to a user's voice input. The computing device 104 may further include a speaker 182. The speaker 182 can be configured to output sound, such as that received over a telephone link. Alternately, or in addition, the speaker 182 can output device-generated sound, such as tones or synthesized speech.

Thus, a user of computing device 104 provides voice input 103 to the computing device 104 using, for example, the microphone 188. The computing device 104 also receives, through the microphone 188, any background audio 105 that is present at or around the time of that the voice audio 103 122 is received.

In response, the computing device 104 can generate an audio stream 107 that includes the voice input 103 and the background audio 105 to the voice recognition system 114 through communications channel 112. The voice recognition system 114 can process the audio stream 107 as discussed in reference to FIG. 1B.

Figure 2:
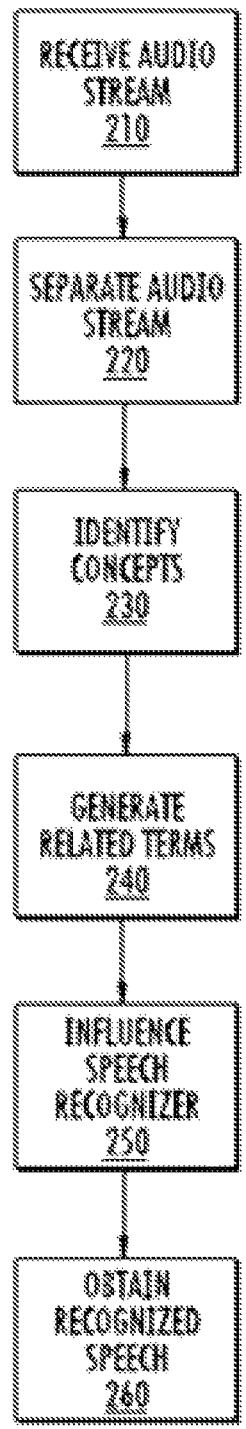
FIG. 2 is a flowchart of a method according to some implementations.

FIG. 2 is a flowchart of a method 200 according to some implementations. In general, the method 200 involves using background audio contained in an audio stream to assist in the recognition of speech also included in the audio stream. For convenience, the method 200 is described in reference to different aspects of a system described in FIGS. 1A-1C, although other configurations are also possible.

At step 210, the computing device 104 receives an audio stream 107 from a user. The user can supply the audio steam as a voice input 103 using microphone 188, for example. The audio stream can, for example, include both voice input 103 provided by the user and background audio 105, where the background audio 105 can be a song, a conversation by people other than the user, or other noises.

At step 220, the computer device 104 can separate the audio stream 107. In some implementations, a voice recognizer 114 communicatively coupled to the computing device 104 can receive the audio stream 107. In some implementations, the computer device 104 can separate the audio stream 107 before providing the separated audio stream to the voice recognizer 114. The audio stream 107 can be separated a first substream and a second substream, where the first and second substreams correspond to the voice input 103 and the background audio 105, respectively.

The first and second substreams can also be used to generate the user speech data 122 and the background audio data 126. For example, the voice recognition system 114 can use conventional techniques to convert an analog audio stream into a digital data representation. In some implementations, the voice recognizer 114 can recognize voice pattern information associated with the user and use the voice pattern information to distinguish the user speech data 122 from the background audio data 126 in the audio stream 107 using the speech separator 118. That is, the voice recognizer 114 can user the voice pattern to separate the user speech data 122 from the background audio data 126.

In some implementations, the background audio 105 can be captured in a time interval that corresponds to the time during which the computing device received the voice input 103. For example, the time interval can be substantially equal to the time it took the user to provide voice input 103 specifying the words "DARK KNIGHT." In some implementations, the computing device 104 gathers background audio 105 included in the audio stream 107 in a time interval that commences after the user has submitted the voice input 103. That is, in some implementations, computing device 104 detects the background audio after the user provides the voice input 103.

For example, the computing device 104 can detect that a user has stopped talking by performing a signal processing technique or other conventional technique to determine that the voice input 103 as captured by the microphone 188 has dropped below a threshold volume level. In some implementations, computing device 104 gathers background audio 105 both before and after the user submits the voice input 103.

At step 230, the background audio recognizer 124 of the voice recognition system 114 identifies concepts associated with the background audio data 126 to produce recognized background audio 130. For example, the background audio recognizer 124 may search an acoustic fingerprint database 120 using background audio data 126 to identify the nature of the background audio. In some implementations, information, such as author, name, and other information associated with particular acoustic fingerprints in the acoustic fingerprint database 120 may be related to other concepts.

For example, Daniel Robert Elfman is a composer of a variety of theme songs, including one for a BATMAN animated television show, as well as a former lead singer for a band. If the background audio recognizer 124 matches background audio data 126 as being from the particular BATMAN animated television show using the acoustic fingerprint database 120, other songs composed and performed by Daniel Robert Elfman may also be identified for later use by the voice recognition system 114.

At step 240, conceptual expander 134 obtains terms related to the recognized background audio 130. For example, the conceptual expander 134 may search a conceptual expansion database 132 that provides terms associated with the one or more concepts of the recognized background audio 130.

If the background audio is a song, such related terms can include, for example, the song title, the song lyrics, the performing artist, the composer, the album, the titles for the other songs on the same album, and any other related information, e.g., from a relational database. If the background audio is a television program or movie audio segment, such related terms can include, for example, the actors, the producers, the title of the program or movie, the network, and any portions from a transcript of the program or movie. However, these are only example terms, and conceptual expansion database 132 may include other terms that are suggested based on the nature of the recognized background audio 130.

In some implementations, additional songs identified by the background audio recognizer 124 using the acoustic fingerprint database 120 can also be used by the conceptual expander 134. In some implementations, a relevance of one or more of the terms related to the recognized background audio 130 may be measured. For example, if one or more of the terms related to the BATMAN theme song is "DARK KNIGHT," a synonym for one or more of the terms, such as "black" and "champion" or other such synonyms may be provided to the conceptual expansion database 132.

The one or more additional concepts associated with the synonyms, however, may have a lower measured relevance than those terms more directly related to the recognized background audio 130. The concepts associated with terms having lowered measured relevance scores may be weighed such that these concepts influence the speech recognition to a lesser degree than the other concepts related to the background audio data 126 with higher relevance scores.

At step 250, the computing device 104 can influence the speech recognition language model 128. For example, the terms identified by the conceptual expander 134 can be used to generate conceptual bias data 136. The conceptual bias data 134 can be used to influence the speech recognition language model 128. For example, if the speech recognition language model 128 is choosing between one or more textual representations for user speech data 122 that have substantially similar frequencies of occurrence in a particular language, the speech recognition language model 128 can use the conceptual bias data 136 to weigh the statistical selection in favor of one textual representation over another.

As another example, the conceptual bias data 136 can override the statistical model and control the determination process. One such example is described above whereby the term "Dark Night" is much more statistically likely, but the conceptual bias data 136 indicates that the correct textual representation is the "Dark Knight." In that example, the conceptual bias data 136 overrides the selection of "Dark Night" and instead "Dark Knight" is selected.

At step 260, the computing device 104 can obtain the recognized speech. For example, the voice recognition system 114 can transmit or otherwise provide a biased recognition hypothesis 138 containing the recognized speech to the computing device 104 using communications channel 112. In some implementations, the computing device 104 can then present or otherwise use the recognized speech, according to one or more tasks in which the recognized speech is being used. For example, the recognized speech can be presented on a display 180 in a text message being generated from voice input provided by the user.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In general, systems capable of performing the disclosed techniques can take many different forms. Further, the functionality of one portion of the system can be substituted into another portion of the system. Each hardware component can include one or more processors coupled to random access memory operating under control of, or in conjunction with, an operating system. The voice recognition system can include network interfaces to connect with clients through a network. Such interfaces can include one or more servers. Further, each hardware component can include persistent storage, such as a hard drive or drive array, which can store program instructions to perform the techniques disclosed herein. That is, such program instructions can serve to perform techniques as disclosed. Other configurations of voice recognition system 114, computing device 104, associated network connections, and other hardware, software, and service resources are possible.

The foregoing description is illustrative, and variations in configuration and implementation can occur. Other resources described as singular or integrated can in implementations be plural or distributed, and resources described as multiple or distributed can in implementations be combined. The scope of the present teachings is accordingly intended to be limited only by the following claims.

What is claimed is:

1. A method comprising:
   receiving, at data processing hardware, from a computing device associated with a user, first audio data and second audio data captured by the computing device;
   processing, by the data processing hardware, the first audio data to identify a concept associated with the first audio data;
   influencing, by the data processing hardware, a speech recognition language model based on the identified concept associated with the first audio data; and
   generating, by the data processing hardware, using the influenced speech recognition language model, a textual representation of the second audio data.

2. The method of claim 1, wherein the computing device captures the first audio data before capturing the second audio data.

3. The method of claim 1, further comprising:
   generating, by the data processing hardware, a set of terms related to the identified concept,
   wherein influencing the speech recognition model based on the identified concept comprises adjusting a probability or relevance score associated with the speech recognition language model recognizing at least one term in the set of terms related to the identified concept.

4. The method of claim 3, wherein generating the set of terms related to the identified concept comprises querying a conceptual expansion database for the set of terms using the identified concept associated with the first audio data.

5. The method of claim 3, further comprising:
   generating, by the data processing hardware, conceptual bias data using set of terms related to the identified concept associated with the first audio data; and
   adjusting, by the data processing hardware, the probability or relevance score associated with the speech recognition language model recognizing the at least one term in the set of terms related to the identified concept based on the conceptual bias data.

6. The method of claim 5, wherein generating the textual representation of the second audio data using the influenced speech recognition language model comprises, selecting, by the influenced speech recognition language model, the textual representation from a set of textual representations that have substantially similar frequencies of occurrence in a particular language by using the conceptual bias data to weigh a statistical selection of the textual representation from the set of textual representations.

7. The method of claim 1, wherein the second audio data corresponds to an utterance spoken by the user of the computing device.

8. The method of claim 1, wherein:
the data processing hardware resides on a server in communication with the computing device; and
the computing device is configured to transmit the first audio data and the second audio data over a communication channel to the data processing hardware residing on the server.

9. The method of claim 1, further comprising transmitting, by the data processing hardware, the textual representation of the second audio data to the computing device, the textual representation when received by the computing device causing the computing device to perform a particular task based on the textual representation.

10. The method of claim 1, further comprising transmitting, by the data processing hardware, the textual representation of the second audio data to the computing device, the textual representation when received by the computing device causing the computing device to display the textual representation on a display.

11. A system comprising:
data processing hardware; and
memory hardware in communication with the data processing hardware and storing instructions, that when executed by the data processing hardware, cause the data processing hardware to perform operations comprising:
receiving, from a computing device associated with a user, first audio data and second audio data captured by the computing device;
processing the first audio data to identify a concept associated with the first audio data;
influencing a speech recognition language model based on the identified concept associated with the first audio data; and
generating, using the influenced speech recognition language model, a textual representation of the second audio data.

12. The system of claim 11, wherein the computing device captures the first audio data before capturing the second audio data.

13. The system of claim 11, wherein the operations further comprise:
generating a set of terms related to the identified concept, wherein influencing the speech recognition model based on the identified concept comprises adjusting a probability or relevance score associated with the speech recognition language model recognizing at least one term in the set of terms related to the identified concept.

14. The system of claim 13, wherein generating the set of terms related to the identified concept comprises querying a conceptual expansion database for the set of terms using the identified concept associated with the first audio data.

15. The system of claim 13, wherein the operations further comprise:
generating conceptual bias data using set of terms related to the identified concept associated with the first audio data; and
adjusting the probability or relevance score associated with the speech recognition language model recognizing the at least one term in the set of terms related to the identified concept based on the conceptual bias data.

16. The system of claim 15, wherein generating the textual representation of the second audio data using the influenced speech recognition language model comprises, selecting, by the influenced speech recognition language model, the textual representation from a set of textual representations that have substantially similar frequencies of occurrence in a particular language by using the conceptual bias data to weigh a statistical selection of the textual representation from the set of textual representations.

17. The system of claim 11, wherein the second audio data corresponds to an utterance spoken by the user of the computing device.

18. The system of claim 11, wherein:
the data processing hardware resides on a server in communication with the computing device; and
the computing device is configured to transmit the first audio data and the second audio data over a communication channel to the data processing hardware residing on the server.

19. The system of claim 11, wherein the operations further comprise transmitting the textual representation of the second audio data to the computing device, the textual representation when received by the computing device causing the computing device to perform a particular task based on the textual representation.

20. The system of claim 11, wherein the operations further comprise transmitting the textual representation of the second audio data to the computing device, the textual representation when received by the computing device causing the computing device to display the textual representation on a display.

* * * * *